United States Patent [19]

Reipur et al.

[11] Patent Number: 5,234,605
[45] Date of Patent: Aug. 10, 1993

[54] FILTER BACKWASHING SYSTEM USING MOVEABLE MEMBER RESPONSIVE TO CLOSING OF FILTER OUTLET

[76] Inventors: John Reipur, Traverbanevej 3, 2920 Charlottenlund, Denmark, DK-2920; Hans Olsen, Christiansholmsvej 32, 2930 Klampenborg, Denmark, DK-2930

[21] Appl. No.: 793,855

[22] Filed: Nov. 18, 1991

[30] Foreign Application Priority Data

Mar. 16, 1990 [DK] Denmark .................. 700/90

[51] Int. Cl.[5] .............. B01D 33/48; B01D 29/66; B01D 35/12
[52] U.S. Cl. .................. 210/741; 55/283; 210/108; 210/333.01; 210/391; 210/411; 210/791; 95/279
[58] Field of Search .............. 210/108, 411, 412, 791, 210/798, 323.2, 333.01, 356, 355, 354, 780, 792, 110, 297, 90, 391, 741; 55/96, 283, 302, 303, 21

[56] References Cited

U.S. PATENT DOCUMENTS

| | | | |
|---|---|---|---|
| 830,652 | 9/1906 | Durbrow | 210/411 |
| 2,296,247 | 9/1942 | Green | 210/741 |
| 2,411,986 | 12/1946 | Cowherd | 162/238 |
| 2,451,073 | 10/1948 | Cowherd | 55/283 |

FOREIGN PATENT DOCUMENTS

| | | | |
|---|---|---|---|
| 2831607 | 1/1980 | Fed. Rep. of Germany | 210/411 |
| 2249526 | 5/1975 | France | 210/108 |
| 1398284 | 6/1975 | United Kingdom | 210/108 |
| 2159725 | 12/1985 | United Kingdom | 210/411 |

Primary Examiner—Joseph W. Drodge
Attorney, Agent, or Firm—Darby & Darby

[57] ABSTRACT

A method and apparatus for filtering a fluid flowing from a fluid supply duct in a first direction through a filtering medium in which separate solid particles or concentrate are released from the filtering medium by a back-flush. The method and apparatus has a moving means, such as a diaphragm, which receives the pressure of the fluid at both the inlet and outlet of the filter. In response to a changing pressure, such as by opening of an outlet valve, the moving means operates, e.g., the diaphragm changes its position, and operates to send a supply of the fluid through the filter medium in a second direction which is opposite to the normal first direction of fluid flow.

23 Claims, 3 Drawing Sheets

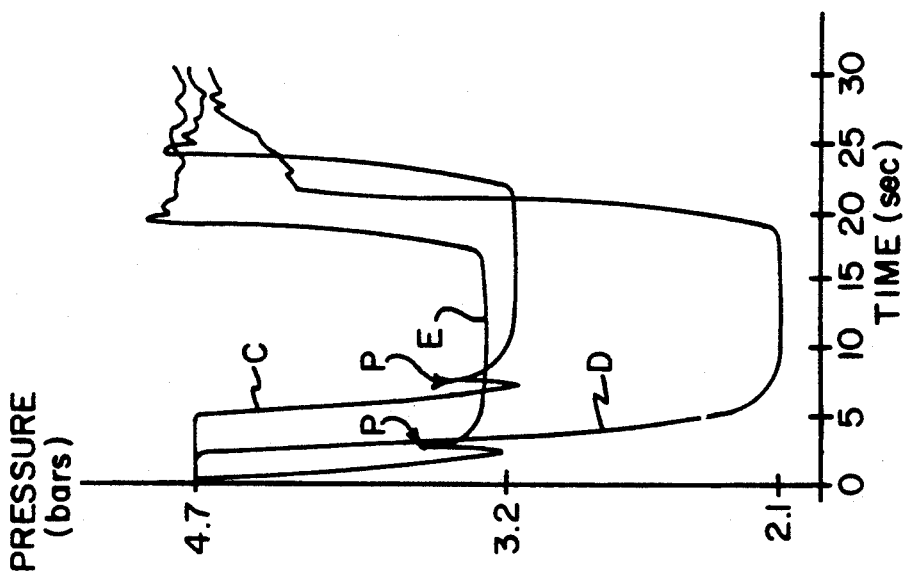
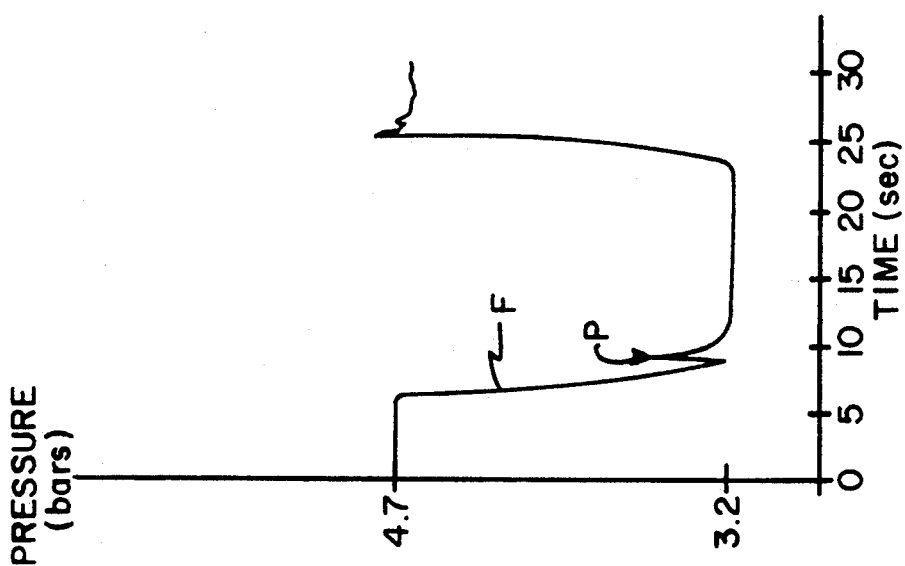
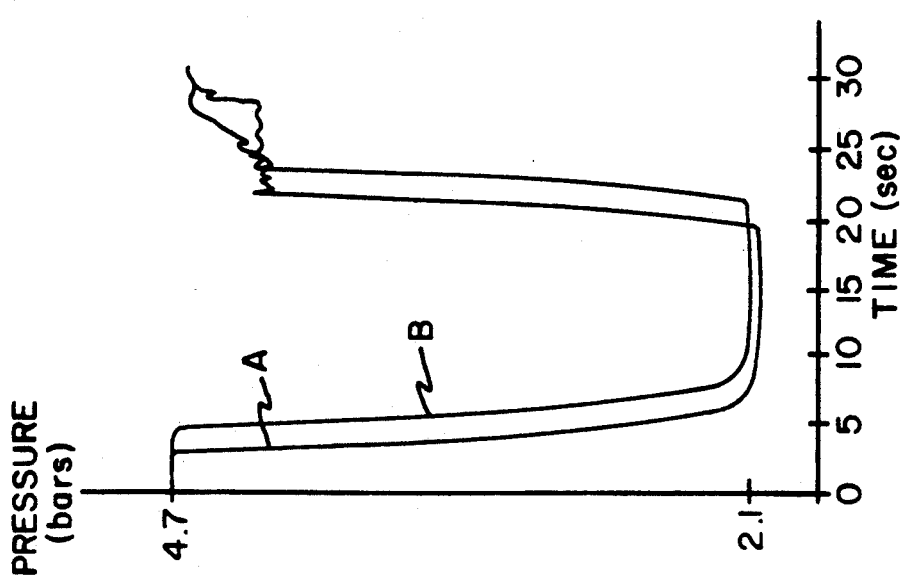

FILTER BACKWASHING SYSTEM USING MOVEABLE MEMBER RESPONSIVE TO CLOSING OF FILTER OUTLET

This application is a continuation of PCT U.S. patent application No. PCT/DK91/00077 filed Mar. 13, 1991, which designated the United States.

BACKGROUND OF THE INVENTION

The present invention relates to a method of filtering a fluid flowing from a fluid supply duct in a first direction through a filtering medium into a fluid discharge duct.

The fluid to be filtered may be a gaseous fluid of any type, such as combustion gas, air, and gases for medical and industrial use. However, the invention particularly relates to filtering a liquid fluid, such as liquid solvents, cleaning fluids, and fluids used in industrial processes. More particularly, the invention relates to filtering of water or aqueous fluids, such as waste water, sea water, lake water or tap water.

In filtering fluids two principally different methods may be used. According to the first method the fluid is filtered by means of a replaceable filter, for example a filter cartridge, which is replaced by a new filter, when it has been more or less clogged up by the solid particles separated from the fluid. In the other known method the solid particles separated form the fluid and adhering to the filtering medium is continuously or intermittently released from the filtering medium. This may be done by imparting a shaking movement to the filtering medium and/or by temporarily reversing the fluid flow through the filtering medium so as to obtain a back-flush.

The first mentioned known method requiring rather frequent replacement of the filter or filter cartridge is rather costly, and the other known method described above requires special accessories and a special power source for operating the same.

SUMMARY OF THE INVENTION

The present invention provides an improved filtering method in which separated solid particles or concentrate are released from the filtering medium from time to time by back-flush without requiring a separate external power source.

Thus, the present invention provides a method of filtering a fluid flowing from a fluid supply duct in a first direction through a filtering medium into a fluid discharge duct, said method comprising starting and stopping the fluid flow through the filtering medium by opening and closing the fluid discharge duct, and creating a brief back-flush movement of the fluid in relation to the filtering medium in a second direction opposite to said first direction by the change in pressure conditions caused by opening and/or closing the fluid discharge duct. It has been found that the desired back-flush movement of the fluid through the filtering medium for releasing filtered solid particles therefrom may be initiated and generated by the change in pressure conditions when the fluid flow through the filtering medium is started and/or stopped by opening and/or closing the fluid discharge duct. Due to friction or flow resistance, inertia, and other factors the pressure condition may be different in various positions of fluid flow path, and this fact may be utilized to obtain the desired back-flush movement.

As an example, the fluid supply duct and a filtering chamber, in which the filtering medium is arranged, may be pressure short-circuited (not flow short-circuited) through a movable, substantially fluid-impervious wall part. When the discharge duct is opened or closed, the pressure in the filtering chamber will suddenly decrease or increase, respectively, so that for a very short period of time different pressures will exist on opposite sides of the movable wall part. This may cause a sudden movement of the movable wall part so as to create a sudden pressure wave, which may be utilized for causing the desired back-flush movement of the fluid. Furthermore, the movable wall part gives rise to considerable pressure vibrations in the fluid, whereby release of filtered solid particles from the filtering medium is considerably improved. The movable wall part may be biased towards a retracted position, so that the movable wall part will return to this position when the flow conditions have become stable.

The desired back-flush movement may be obtained by moving the filtering medium in said first direction in relation to the fluid adjacent thereto when the fluid discharge duct is opened.

Another aspect of the invention relates to a filtering apparatus for filtering a fluid that has a filtering chamber, a fluid penetrable filtering medium arranged within the filtering chamber so as to separate inlet and outlet spaces therein. The apparatus defines a fluid inlet and outlet openings communicating with the inlet and outlet spaces, respectively, so as to direct the fluid to be filtered in a first direction from the inlet opening to the outlet opening. The fluid adjacent to the filtering medium is briefly moved in relation to the filtering medium in a second direction opposite to said first direction so as to back-flush the filtering medium, under the influence of a change in pressure conditions in the fluid caused by opening and/or closing the fluid outlet opening. Due to flow friction or flow resistance. This is accomplished for example, through the filtering medium, when a fluid is flowing through the fluid flow path defined in the apparatus, inertia, etc. Opening and closing of the fluid outlet opening will cause a considerably difference in pressure conditions in various positions of the fluid flow path of the apparatus. These different pressure conditions may be used for moving fluid in relation to the filtering medium so as to obtain the desired back-flush or back flow as explained above.

The said moving means may comprise a movable wall part at least partly defining the filtering chamber and being movable between retracted and extend positions, the movable wall part being biased towards its retracted position. The movable wall part is moved when the fluid outlet opening is closed and opened because of the sudden pressure increase and pressure drop in the filtering chamber caused thereby. The movable wall part also gives rise to pressure vibrations in the fluid, when the fluid outlet opening is opened and closed, which may cause several consecutive back-flush movements of the fluid through the filtering medium.

The filtering apparatus may further comprise a fluid inlet duct defining the inlet opening, said movable wall part at least partly defining he inlet duct at a location upstream of the filtering chamber and also partly defining the fluid outlet space, the volume of the outlet space being reduced when the movable wall part is moved from its retracted to its extended position. As long as the fluid outlet opening is closed, the movable wall part will remain in its retracted position due to the bias towards that position. When, however, the fluid outlet opening is opened, this causes a sudden pressure drop within the inlet and outlet spaces of the filtering chamber. Since the movable wall part establishes a kind of pressure short-circuiting between the fluid inlet duct and the fluid outlet space of the filtering chamber, the movable wall part will suddenly be moved from its retracted to its extended position causing a sudden displacement of a substantial volume of liquid within the outlet space. This means that the relatively high pressure of the fluid within the fluid inlet duct is transmitted to the fluid outlet space of the filtering chamber, while the pressure within the inlet space of the filtering chamber is still relatively low. Consequently, fluid is displaced from the fluid outlet space, through the filtering medium, and into the fluid inlet space, whereby solid particles filtered form the fluid and adhering to the filtering medium at the inlet side thereof are released therefrom due to the brief fluid back-flow.

The filtering medium may be of any suitable type and shape which may perform the desired filtering function. In a preferred embodiment, the filtering medium comprises at least one tubular filtering member, and in that case the inlet space of the filtering chamber may include the inner hollow space of the tubular member. Still more preferred, the filtering medium may comprise a bundle of a plurality of substantially parallel tubular filtering members extending through the filtering chamber, and the inlet space of the filtering chamber may then include the inner hollow spaces of all of the tubular members. In the latter case it is possible to obtain a large combined filtering surface allowing use of a filtering medium which may retain very small particles including bacteria, fungus spores, etc. As an example, the filtering medium may be of the type disclosed in U.S. Pat. No. 4,798,847 which is hereby incorporated herein by reference.

When the filtering medium comprises a single tubular filtering member or a bundle of such tubular filtering members, the filtering chamber may be defined within a surrounding tubular housing, and the inner space or spaces of the tubular member or members may communicate with the inlet duct at one end of the housing, and the outlet space of the filtering chamber may communicate with an outlet duct at the other end of the housing. Furthermore, the moving means may comprise a tubular diaphragm or hose of a resilient, substantially fluid impervious material surrounding the tubular filtering member or bundle of filtering members and separating the inlet duct from the outlet space of the filtering chamber. This means that the inlet duct may be defined between an outer housing and the tubular diaphragm and the outlet space of the filtering chamber is defined between the outer surface of the tubular member or bundle of tubular members and the inner surface of the surrounding tubular diaphragm.

In order to obtain a relatively large displacement of fluid volume from the outlet space of the filtering chamber when the movable wall part is suddenly moved from its retracted to its extended position, the effective area of the movable wall part should preferably considerably exceed the cross-sectional area of the inlet duct extending between the movable wall part and the inlet opening of the filtering chamber.

The desired back-flush movement of fluid in relation to the filtering medium may also be obtained when the movable wall part at least partly defines the outlet space of the filtering chamber and the filtering medium is connected to and movable together with the movable wall part between its extended and retracted positions. The volume of the outlet space may be reduced or increased when the movable wall part is moved to its retracted position. When the filtering medium is connected to and movable together with the movable wall part the filtering medium may cover an opening defined in the movable wall part. In that case the movable wall part may define a partition wall extending transversely through the filtering chamber and separating the inlet and outlet spaces therein. When the outlet opening is closed the pressure will be the same on both sides of the movable wall part or partition wall which will be in its retracted position. When, however, the outlet opening is opened the pressure in the outlet space will decrease whereby the partition wall is suddenly moved to its extended position so as to considerably reduce the volume of the outlet space. Consequently, the pressure within the outlet space will increase and cause a brief back-flush through the filtering medium.

Alternatively, an inner side surface of the movable wall part may be exposed to fluid in the fluid outlet space while the opposite outer side surface of the movable wall part is exposed to the ambient atmosphere. In that case, when the fluid outlet opening is closed the movable wall part will be retained in its extended position against the biassing force by the pressure prevailing in the filtering chamber. When, however, the fluid outlet opening is opened, the sudden decrease in pressure within the filtering chamber causes the movable wall part to suddenly move back to its retracted position under the influence of the biassing force acting on the movable wall part. Since the filtering medium is moved together with the movable wall part in relation to the fluid within the filtering chamber the desired back-flush movement is obtained.

The filtering medium may be a stiff, sieve-like member connected directly to and movable together with the movable wall part. Alternatively, the filtering medium may be a stopper-like porous, fibrous mass. In such case, the filtering medium may be arranged within a filter housing defining the inlet space of the filtering chamber, and the housing as well as the filtering medium arranged therein may then be connected to and movable together with the movable wall part. The movable wall part may then define a central opening therein, and the inlet space may communicate with this central opening.

In order to promote back-flushing of fluid through the filtering medium, the cross-sectional area of the outlet opening is preferably considerably smaller than the area of the movable wall part defining the outlet space of the filtering chamber.

The movable wall part may be a diaphragm or membrane, which may, for example, be made from resilient rubber, plastic material, and/or from metal, so that the diaphragm is biased towards its retracted position under the influence of its inherent resiliency or elasticity. Alternatively, the movable wall part may include a flexible diaphragm or membrane not having a resiliency sufficient to return the membrane to its retracted position. In such case, a spring or outer separate biassing means may be provided for biassing the diaphragm to its retracted position. The movable wall part may alternatively comprise a piston-like member, which may also be biassed towards its retracted position by a spring or other suitable biassing means.

When a filtering apparatus as described above is used for filtering a fluid flow which is started and stopped from time to time, the apparatus automatically causes a fluid back-flush through the filtering medium so that particles which have been filtered from the fluid flow and adhere to the filtering medium is released therefrom and retained within the inlet space of the filtering chamber. Consequently, the filtering medium is not clogged up, and the resistance against fluid flow through the filtering medium remains substantially unchanged. However, because the filtered particles or concentrate is currently collected within the inlet space of the filtering chamber, such concentrate must be discharged from the inlet space when a certain amount has been collected. Therefore, the filtering apparatus according to the invention may further comprise a concentrate outlet communicating with the inlet space of the filtering chamber and valve means for closing the concentrate outlet. The concentrate outlet is normally closed. It may, however, selectively be opened, and the collected concentrate will then be discharged or flushed from the inlet space and discharged through the concentrate outlet.

BRIEF DESCRIPTION OF THE DRAWINGS

The invention will now be further described with reference to the drawings, wherein FIGS. 4-6 are diagrams illustrating the change in pressure at various positions of the apparatus shown in FIGS. 1 and 2 during a time period in which a fluid flow through the apparatus is started and stopped.

DETAILED DESCRIPTION OF THE INVENTION

Figure 1:
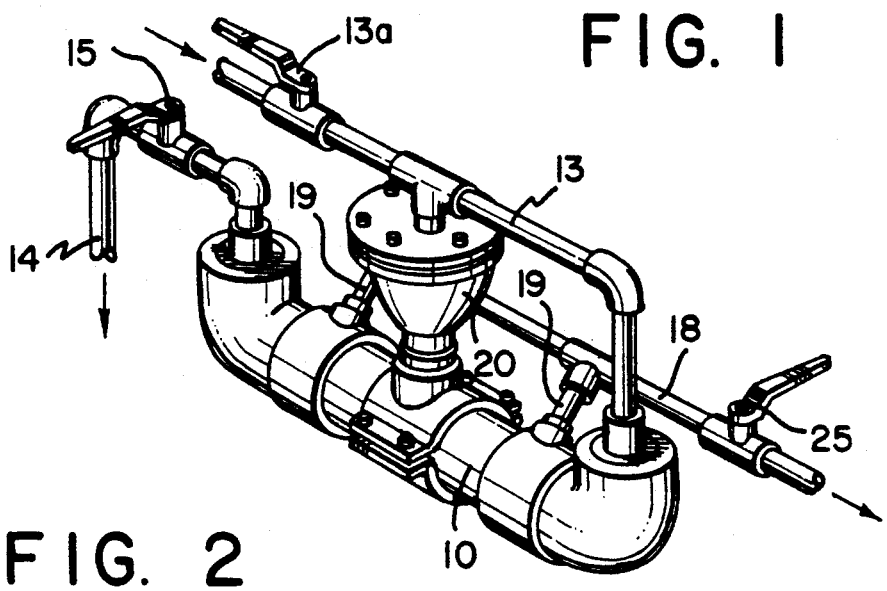
FIG. 1 is a perspective view of a first embodiment of the filtering apparatus according to the invention.
Figure 2:
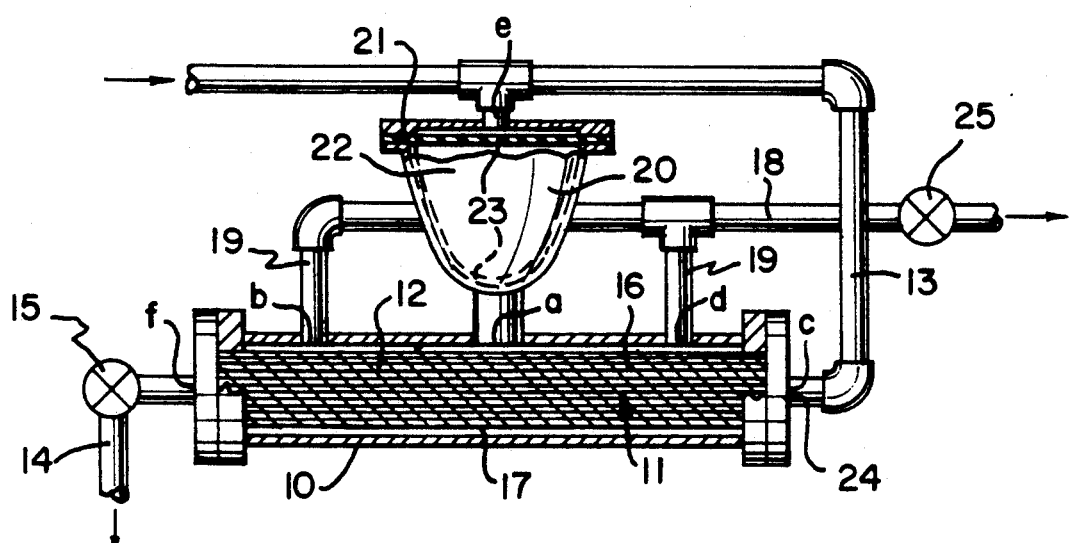
FIG. 2 is a diagrammatic sectional side view and partially showing the apparatus of FIG. 1.

The apparatus shown in FIGS. 1 and 2 comprises an elongated filtering housing 10 defining a filtering chamber 11 therein. The filtering housing may, for example, be cylindrical as shown in the drawings. The filtering housing contains a bundle 12 of tubular filtering elements extending between opposite ends of the filtering housing 10. At one end of the housing 10 the inner spaces of the filtering elements 12 are connected to a fluid inlet tube 13. The opposite ends of the tubular filtering elements in the bundle 12 are connected to a concentrate outlet tube 14, which is normally closed by a valve 15.

This means that the cylindrical walls of the filtering elements in the bundle 12 divide the filtering chamber 11 into a fluid inlet space 16 formed by the combined inner hollow spaces of the filtering elements, and a fluid outlet space 17 defined by the inner walls of the housing 10 and the outer cylindrical walls of the filtering elements of the bundle 12. The fluid outlet space 17 is communicating with a fluid outlet tube 18 via connecting tubes 19. Thus fluid supplied through the inlet tube 13 is passed into the inner spaces of the tubular filtering elements in the bundle 12, through the walls of the filtering elements and into the outlet tube 18 via the outlet space 17 and the connecting tubes 19. A diaphragm housing 20 is divided into two separate chambers 21 and 22 by means of a partition wall 23, which may be an elastic or resilient diaphragm or membrane as shown in FIG. 2. The diaphragm 23 is movable between retracted and extended positions shown in solid and dotted lines, respectively, in FIG. 2. The movable partition wall is biassed towards is retracted position, and when the partition wall is a diaphragm as shown in FIG. 2, the biassing force is preferably obtained by the inherent resiliency of the elastic or resilient material of the diaphragm. The chamber 21 of the diaphragm housing 20 is connected to the fluid inlet tube 13 at a position upstream of the fluid inlet opening 24 of the filtering housing 10 through which opening fluid from the inlet tube 13 flow into the inlet space 16 of the filtering chamber 11.

The other chamber 22 of the diaphragm housing 20 is connected to the fluid outlet space 17. The diaphragm housing 20 may be tapered or cup-shaped as shown in FIGS. 1 and 2, and in such case the partition wall or diaphragm 23 is mounted at the broader end of the housing 20 and the narrow end of the housing is connected to the fluid outlet space 17 of the filtering chamber 11. The diaphragm housing 20 interconnecting the fluid inlet tube 13 and the fluid outlet space 17 of the filtering chamber 11 allows for a direct pressure transmission between the inlet tube 13 and the outlet space 17 through the diaphragm housing 20, but the fluid-tight diaphragm 23 prevents fluid from flowing directly from one of the chambers 21 and 22 in the diaphragm housing 20 to the other. Therefore, the diaphragm housing 20 defines a pressure short-circuiting, but not a flow short-circuiting.

The bundle 12 of tubular filtering elements could be replaced by one or a few tubular filtering elements. The filtering medium from which the filtering elements are made are chosen in dependency of the kind of fluid to be filtered and of the sizes and kinds of the particles to be filtered or separated from the fluid. If, for example, only coarser particles are to be filtered from the fluid the tubular filtering element or elements may be made form a perforated, sieve-like wall of metal or plastic material. In case it is desired to remove smaller particles from the fluid to be filtered a fibrous filtering material or any other suitable kind of filtering material can be used. The apparatus shown in FIGS. 1 and 2 may, for example, be used for filtering drinking water and may then be connected to a water supply tube for filtering tap water supplied to an apartment or a dwelling house. In the latter case each of the filtering elements in the bundle 12 may be made from a filtering material of the type disclosed in the above U.S. patent.

The filtering apparatus shown in FIGS. 1 and 2 operates as follows: The fluid supply tube 13 may be a water supply tube for supplying water from a water works. When a tap in the apartment or dwelling housing—symbolized by a valve 25 in the fluid outlet tube 18—is opened non-filtered water flows from the inlet tube 13 through the filtering elements in the bundle 12, whereby bacteria, fungus spores and other particles of solid matter are retained in the inlet space 16 adhering to the inner walls of the tubular filtering elements. Clean filtered water or permeate flows from the outlet space 17 through the outlet tube 18 to the tap or valve 25. If no special measures were taken the filtering medium would be clogged up after a certain period of use whereby the flow resistance through the filtering medium would become unacceptable. This would require a rather frequent, costly replacement of the bundle 12 of filtering elements.

However, in the apparatus shown in FIGS. 1 and 2 the provision of the diaphragm housing 20 avoids such frequent replacement of the filtering elements because as explained in the following a brief back-flush of clean water from the outlet space 17 through the filtering medium and into the inlet space 16 is obtained each time the tap or valve 25 is opened.

When the tap or valve 25 is closed the pressure within the chambers 21 and 22 on either side of the diaphragm 23 are substantially the same. Therefore, the diaphragm is in its retracted unstressed position shown in solid lines in FIG. 2. When, however, the tap or valve 25 is opened the pressure drops very suddenly in the outlet tube 18 and in the outlet space 17 connected thereto. Because of the flow resistance through the filtering medium the pressure in the inlet tube 13 is still at a high level. This means that for a rather short period of time the pressure within the chamber 22 of the diaphragm housing 20 will be substantially lower than the pressure within the chamber 21. Consequently, opening of the tap 25 causes that the diaphragm 23 is moved rather suddenly from its retracted to its extended position shown in dotted lines in FIG. 2, whereby a relatively large volume of water or fluid is displaced from the chamber 22 into the outlet space 17 of the filtering chamber 11, and water or fluid is drawn from the fluid inlet tube 13 into the expanding chamber 21. Therefore, the sudden movement of the diaphragm 23 causes a pressure increase in the fluid outlet space 17 and a pressure decrease in the fluid inlet space 16 so that filtered liquid from the fluid outlet space is forced through the filtering medium into the fluid inlet space whereby filtered particles or concentrate adhering to the filtering medium is released and clogging up of the filtering medium is avoided.

Preferably, the cross-sectional area of the opening interconnecting the chamber 22 and the outlet space 17 considerably exceeds the combined cross-sectional areas of the connecting tubes 19. This will increase the back-flush effect because the fluid suddenly displaced form the chamber 22 by the moving diaphragm 20 cannot immediately escape through the tubes 19.

The filtered particles or concentrate being collected in the fluid inlet space 16 within the filtering tubes may be removed from time to time. This may be done by opening the concentrate outlet tube 14 by means of the valve 15 while the tap or valve 25 in the fluid outlet tube is closed. Opening of the valve 15 causes not only an initial back-flush movement through the walls of the filtering tubes as described above, but also a longitudinal flushing of the filtering tubes by water flowing from the fluid inlet tube 13, through the tubular filtering elements 12 and out through the concentrate outlet tube 14. If desired, this flushing procedure may be performed automatically, for example by means of a timer adjusted to open the valve 15 at certain predetermined time intervals. The fluid inlet tube may be closed by means of a valve 13a, FIG. 1. This valve is, however, normally in its open position.

FIGS. 4–6 are diagrams illustrating the pressure variations at various positions of the apparatus shown in FIGS. 1 and 2 when the fluid inlet tube is connected to a water supply tube from a water works and the tap or valve 25 is opened for about 20 seconds and thereafter closed again. The graphs shown in FIG. 4 and being designated A and B illustrate the pressure variation at the positions a and b, shown respectively, in FIG. 2. FIG. 6 is a diagram with three graphs designated C, D and E showing the pressure variations at positions c, d, and e, shown respectively, in the apparatus shown in FIG. 2. FIG. 5 is a diagram with a graph designated F showing the pressure variations at the position f in the apparatus shown in FIG. 2.

The graphs E and C in FIG. 6 and the graph F in FIG. 5 have a peak P indicating that shortly after opening the valve 25, which causes a pressure decrease, a sudden brief pressure increase is measured at the positions c, e, and f. This pressure increase is due to the back-flush through the filtering medium caused by the sudden movement of the diaphragm. Flow measurements confirm that water flows from the outlet space 17, through the walls of the filtering elements and to the fluid inlet opening 24 at substantially the same time as when the pressure peaks P appear. The graphs shown in FIGS. 4–6 also indicate that pressure vibrations are generated immediately after closing the tap or valve 25. Such pressure vibrations also causes a plurality of consecutive back-flush movements of the liquid through the filtering medium. Therefore, these pressure vibrations, which are also caused by the existence of the diaphragm or membrane 23, further contribute to releasing filtered particles from the filtering medium.

Further embodiments of the filtering apparatus according to the invention will now be described with reference FIGS. 3 and 7–9, and apparatus parts corresponding to similar parts in FIGS. 1 and 2 are designated by the same reference numerals.

Figure 3:
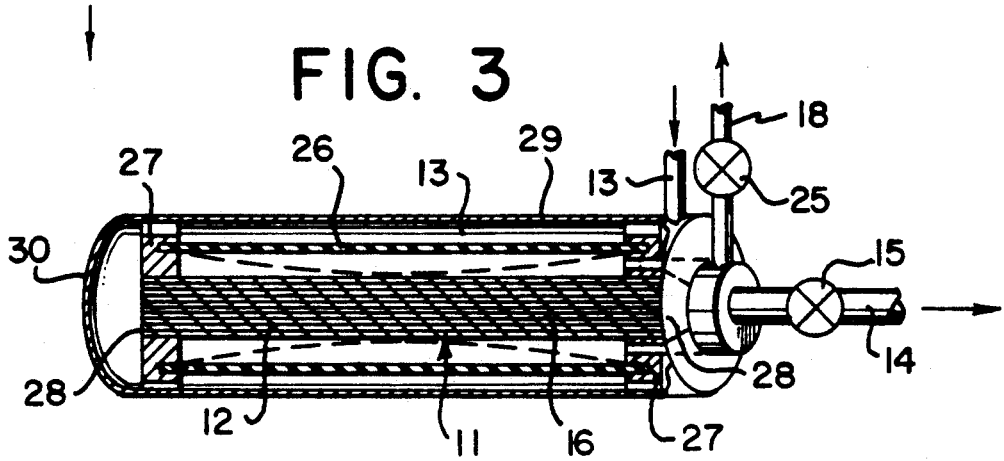
FIG. 3 is a diagrammatic sectional view of a second embodiment of the filtering apparatus according to the invention.

In the apparatus shown in FIG. 3 the peripheral wall of the filter housing 10 has been replaced by a flexible, elastic tubular hose or diaphragm 26 having its opposite ends mounted in annular retainer members 27. The fluid outlet tube 18 is connected to one of the retainer members 27. The outlet tube 18 surrounds and is radially spaced from the concentrate outlet tube 14. The end of the bundle 12 of the filtering elements opposite to the outlet tube 14 is received in the adjacent the retainer member 27 and the other end of the bundle is received in an enlargement of the concentrate outlet tube 14. In the embodiment shown in FIG. 3 as well as in the embodiments shown in FIGS. 1 and 2 the outer peripheral surfaces of the tubular filtering elements are radially spaced and the opposite ends of the filtering elements int he bundle 12 are sealingly received in respective openings formed in end plates 28 in such a manner that a fluid inlet passage 13 and the concentrate outlet tube 14 are communicating with the inner spaces of the filtering elements, but not with the spaces therebetween. An apparatus housing 29 having a closed and 30 surrounds the filter housing or hose 26 so as to define the fluid inlet passage 13 between the inner wall of the housing 29 and the outer surface of the hose 26. The retaining members 27 and the outlet tubes 14 and 18 are fastened to the housing 29, for example by radially extending connecting members, not shown.

When the top or valve 25, shown in FIG. 3, in the outlet tube 18 is in its closed position, the pressure inside and outside the hose 26 is substantially the same and the hose 26 will be in its retracted, unstressed position shown with solid lines in FIG. 3. When, however, the tap or valve 25 is opened the pressure within the fluid outlet space 17 will drop causing the hose 26 to suddenly move to its extended, stressed position indicated by broken lines in FIG. 3. This sudden movement of the hose causes displacement of a large volume of fluid from the fluid outlet space 17. Since the annular opening 18a interconnecting the fluid outlet space 17 with the fluid outlet tube 18 is restricted filtered liquid from the outlet space 17 is forced through the walls of the filtering elements 12 and back into the fluid inlet space 16, whereby filtered particles are released from the filtering medium. The valve 15 may be opened from time to time whereby particles or concentrate collected within the tubular filtering elements may be flushed out as described above.

Figure 7:
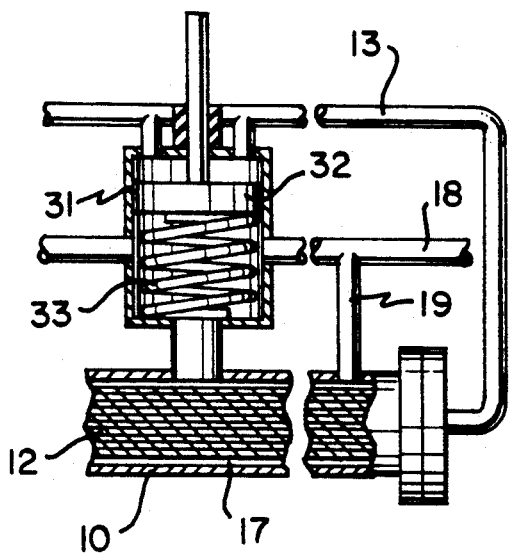
FIG. 7 is a sectional view illustrating a modification of the embodiment shown in FIGS. 1 and 2, and FIG. 8 and 9 are diagrammatic sectional views showing a third and fourth embodiment of the apparatus according to the invention, respectively.

The flexible diaphragm 23 shown in FIG. 2 maybe replaced by another kind of a movable partition wall biassed towards its retracted position. As an example, the cup-shaped diaphragm housing 20 and the diaphragm 23 mounted therein may be replaced by a cylindrical housing 31 having a piston 32 sealingly engaging with the inner walls of the cylindrical housing and reciprocatingly mounted therein as shown in FIG. 7. The piston 32 may be biassed towards its retracted position by means of a spring 33, such as a helical compression spring or another type of spring means. Otherwise, the modified embodiment shown in FIG. 7 operates as described in connection with FIGS. 1 and 2.

Figure 8:
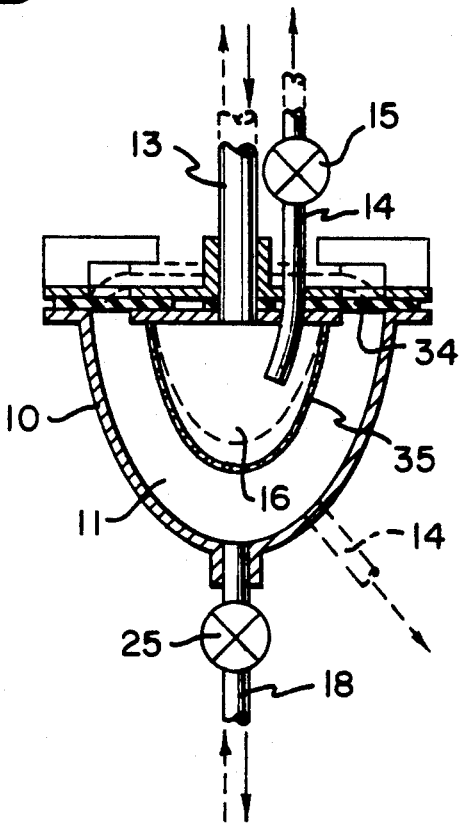

In the embodiment shown in FIG. 8 the filter housing 10 is connected to the fluid outlet tube 18 at one end and the other end of the housing 10 is closed by a flexible, annular diaphragm 34. The fluid inlet tube 13 is connected to and movable together with the diaphragm 34 and opens into the filtering chamber 11 through a central opening of the diaphragm. The rim portion of a cup- or bag-shaped filter element 35, which is preferably of a relatively stiff material, is also fastened to the central part of the diaphragm 34. When the fluid outlet tube 18 is closed by means of the valve 25 a superatmospheric pressure is prevailing within the filtering chamber 11. Because the inner side of the annular diaphragm 34 is exposed to superatmospheric pressure and the outer side of the diaphragm is exposed to the ambient atmosphere the flexible, resilient diaphragm 34 will be moved to its extended, stressed position shown in dotted lines in FIG. 8, in which position the diaphragm may engage with backing members 36 fastened to the housing 10.

When the valve 25 is opened the pressure drop in the outlet space 17 of the filtering chamber 11 causes the diaphragm 34 to make a sudden movement back to its retracted, unstressed position shown in solid lines in FIG. 8, under the influence of the inherent bias of the diaphragm. Since the filter 35 is moved together with the diaphragm 34 and since the inward movement of the diaphragm causes a sudden pressure increase in the fluid outlet space 17 filtered fluid from the space 17 is forced through the wall of the filter 35 so as to release particles adhering to the inner side of the filter. When the valve 25 is closed the diaphragm 34 and the filter 35 connected thereto are moved back to the extended position of the filter. From time to time the valve 15 of the concentrate outlet tube 14 may be opened to discharge concentrate from the fluid inlet space 16 as previously explained.

As indicated by dotted arrows, fluid to be filtered may alternatively be passed in the opposite direction through the apparatus. This means that fluid is supplied through the tube 18 and is discharged through the tube 13. In such case the valve 25 should be mounted in the tube 13. When the tube 13 is closed the diaphragm 34 is in its extended position shown in dotted lines in FIG. 8. When the tube 13 is opened the diaphragm moves to its retracted position shown in solid lines. However, this movement of the filter 35 against the normal flow direction does not release filtered particles from the filter. Such release takes place when the tube 13 is closed and the diaphragm 34 and the filter 35 fastened thereto are caused to move to the extended position shown in dotted lines in FIG. 8.

Figure 9:
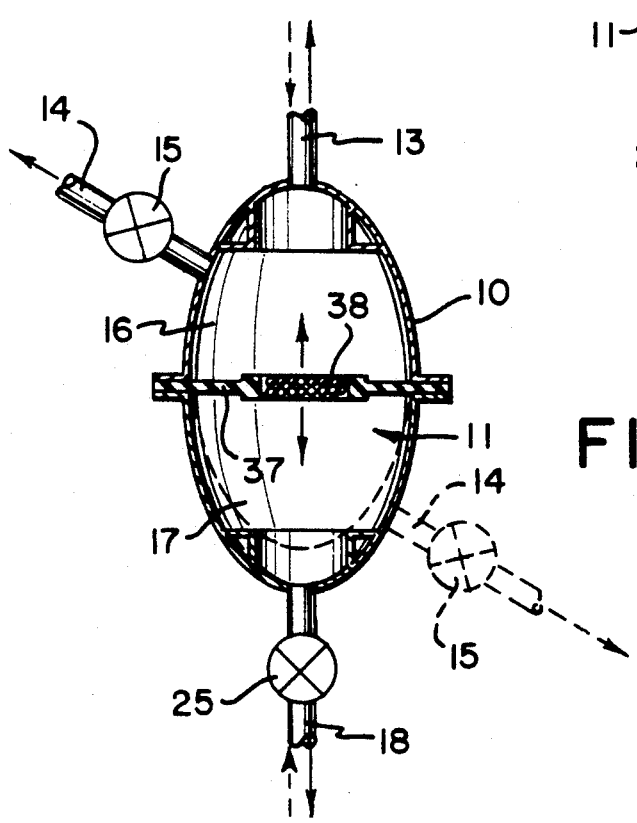

FIG. 9 illustrates a simple embodiment of the filtering apparatus according to the invention. This apparatus comprises a housing 10 having the fluid inlet tube 13 and the fluid outlet tube 18 connected to opposite ends thereof. The filtering chamber 11 defined within the housing is divided into the fluid inlet space 16 and the fluid outlet space 17 by means of a flexible, resilient annular diaphragm 37 having a central opening in which a filter or a filtering medium 38 is received. The peripheral rim portion of the diaphragm is fastened to the peripheral wall of the housing 10 and extends transversely across the inner space of the housing. When the valve 2 is in its closed position the diaphragm 37 with the filtering member 38 attains a retracted, unstressed position shown in solid lines in FIG. 9. When, however, the valve 25 is opened the pressure drop within the fluid outlet space 17 causes a sudden movement of the diaphragm 37 and the filtering member 38 to an extended, stressed condition shown in dotted lines in FIG. 9. Since the area of the diaphragm 37 considerably exceeds the cross-sectional area of the outlet tube 18 the diaphragm movement causes a sudden pressure increase within the fluid outlet space 17, so that fluid from the outlet space 17 is forced through the filtering medium or the filtering member 38 and into the fluid inlet space 16. Concentrate collected within the fluid inlet space 16 may from time to time be removed by opening the valve 15 in the concentrate outlet tube 14 as described above. Since the apparatus shown in FIG. 9 is substantially symmetrical in relation to the plane of the diaphragm 37 the direction of fluid flow through the apparatus may be reversed, if desired.

It should be understood that various modifications and changes of the embodiments described above and shown in the drawings could be made without departing rom the scope of the present invention. As an example, the housing 10 of the apparatus shown in FIG. 9 could be cylindrical and the diaphragm 37 could then be replaced by an annular piston member axially movable within the cylindrical housing 10. Such piston member having the filtering medium 38 mounted in its central opening could be biassed towards its retracted position, for example by means of a compression spring or another spring member. While the embodiment shown in FIGS. 1 and 2 has been described as being suited for filtering drinking water it should be understood that the apparatus according to the invention could be used for filtering any kind of liquid and could also be used for filtering air and other kinds of gaseous fluid.

We claim:

1. A method of filtering a fluid flowing from a fluid supply duct in a first direction through a filtering medium into a fluid discharge duct, said method comprising the steps of:

providing a member which is movable as a result of fluid pressure in both the fluid supply duct and the fluid discharge duct, selectively starting and stopping the fluid flow through the filtering medium by opening and closing the fluid discharge duct, and creating from said member a back-flush movement of the fluid in relation to the filtering medium in a second direction opposite to said first direction as a result of a change in fluid pressure acting on such member caused by at least one of the opening and closing of the fluid discharge duct.

2. A filtering apparatus for filtering a fluid comprising a filtering chamber having filter, fluid containing, inlet and outlet spaces, a fluid-penetrable filtering medium arranged within the filtering chamber so as to separate the fluid inlet and outlet spaces, means defining fluid inlet and outlet openings communicating with the filter inlet and outlet spaces to direct fluid to be filtered in a first direction from the inlet opening through the filtering medium to the outlet opening the outlet opening being selectively openable and closeable, and moving means responsive to the pressure of both the fluid int he inlet opening and the fluid in the outlet opening and responsive to a change in the fluid pressures caused by at least one of selectively opening and closing of the fluid outlet opening for moving fluid adjacent to the filter medium in relation to the filtering medium in a second direction opposite to said first direction to back-flush the filtering medium.

3. A filtering apparatus according to claim 2, wherein said moving means comprise a movable wall part at least partly defining the filtering chamber and being movable between retracted and extended positions, the movable wall part being biased towards its retracted position.

4. A filtering apparatus according to claim 3, further comprising a fluid inlet duct connected to the inlet opening, said movable wall part having inner and outer side surfaces with the outer side surface being in fluid communication with the inlet duct at a location upstream of the filtering chamber and the inner side surface being in fluid communication with the fluid outlet space, the volume of the outlet space being reduced when the movable wall part is moved from its retracted to its extended position.

5. A filtering apparatus according to claim 4, wherein the filtering medium comprises at least one tubular filtering member.

6. A filtering apparatus according to claim 5, wherein the filtering medium comprises a plurality of substantially parallel tubular filtering members extending in the filtering chamber.

7. A filter apparatus according to claim 5, wherein the inner space of a tubular filter member communicates with the fluid inlet duct at one end of the tubular members.

8. A filtering apparatus according to claim 5, wherein the moving means comprise a tubular member of a resilient, substantially fluid impervious material surrounding the tubular filtering member and separating the inlet duct from the outlet space of the filtering chamber.

9. A filtering apparatus according to any of the claims 4-8, wherein the effective area of the movable wall part considerably exceeds the cross-sectional area of both the inlet duct as its fluid communication with the movable wall opening and the inlet opening of the filtering chamber.

10. A filtering apparatus according to claim 3, the movable wall part at least partly defining the outlet space of the filtering chamber, and the filtering medium being connected to and movable together with the movable wall part between its extended and retracted positions, the volume of the outlet space being reduced when the movable wall part is moved to its retracted position.

11. A filtering apparatus according to claim 10, wherein the filtering medium covers an opening defined in the movable wall part.

12. A filtering apparatus according to claim 11, wherein the movable wall part defines a partition wall extending transversely through the filtering chamber and separating the inlet and outlet spaces therein.

13. A filtering apparatus according to claim 10, wherein an inner side surface of the movable wall part is exposed to fluid in the fluid outlet space, the outer side surface of the movable wall part being exposed to the ambient atmosphere.

14. A filtering apparatus according to claim 10, wherein the filtering medium is arranged within a filter housing defining the inlet space of the filtering chamber, said housing being connected to and movable together with the movable wall part.

15. A filtering apparatus according to claim 14, wherein the movable wall part defines a central opening therein, the inlet space communicating with said central opening.

16. A filtering apparatus according to any of the claim 10, wherein the cross-sectional area of the outlet opening is considerably smaller than the area of the movable wall part defining the outlet space of the filtering chamber.

17. A filtering apparatus according to claim 16, wherein the outlet space of the filtering chamber has a cross-sectional area decreasing from one end surface defined by the movable wall part to an opposite end surface defining the outlet opening therein.

18. A filtering apparatus according to claim 3, wherein the movable wall part is a diaphragm.

19. A filtering apparatus according to claim 3, wherein the movable wall part is a piston-like member.

20. A filtering apparatus according to claim 2, further comprising a concentrate outlet communicating with the inlet space of the filtering chamber and valve means for closing said outlet, the valve means being operable so as to open the outlet for discharging collected solid particles from said inlet space.

21. A method of filtering a fluid flowing from a fluid supply duct in a first direction through a filtering medium and into a fluid discharge duct, said method comprising:

selectively starting and stopping the fluid flow through the filtering medium by opening and closing the fluid discharge duct, and causing a change in relative pressures between the fluid supply duct and a filter chamber in which the filtering medium is arranged by means of a movable, substantially fluid impervious chamber wall part, the wall part responding to a change in the fluid pressures caused by at least one of the opening and closing of the fluid discharge duct to create a back-flush movement of the fluid in relation to the filtering medium in a second direction opposite to said first direction.

22. A method according to claim 21, wherein the movable wall part is biassed towards a retracted position.

23. A method of filtering a fluid flowing from a fluid supply duct in a first direction through a filtering medium into a fluid discharge duct, said method comprising:

selectively starting and stopping the fluid flow through the filtering medium by opening and closing the fluid discharge duct, and moving the filtering medium in said first direction in relation tot he flush adjacent thereto when the fluid discharge duct is opened and creating a back fluid movement of the fluid in relation to the filtering medium in a second direction opposite to said first direction by a change in pressure conditions across a movable member caused by at least one of the opening and closing of the fluid discharge duct.

* * * * *